(12) United States Patent
Korst et al.

(10) Patent No.: US 7,613,531 B2
(45) Date of Patent: Nov. 3, 2009

(54) USER AWARE AUDIO PLAYING APPARATUS AND METHOD

(75) Inventors: Johannes Henricus Maria Korst, Eindhoven (NL); Steffen Clarence Pauws, Eindhoven (NL); Serverius Petrus Paulus Pronk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 251 days.

(21) Appl. No.: 10/579,414

(22) PCT Filed: Nov. 8, 2004

(86) PCT No.: PCT/IB2004/052333
§ 371 (c)(1),
(2), (4) Date: May 15, 2006

(87) PCT Pub. No.: WO2005/050642
PCT Pub. Date: Jun. 2, 2005

(65) Prior Publication Data
US 2007/0133357 A1    Jun. 14, 2007

(30) Foreign Application Priority Data
Nov. 18, 2003  (EP) .................................. 03104244

(51) Int. Cl.
*G06F 17/00* (2006.01)
(52) U.S. Cl. ........................... 700/94; 381/87; 455/66.1
(58) Field of Classification Search .................... 700/94
See application file for complete search history.

(56) References Cited

U.S. PATENT DOCUMENTS

| | | | |
|---|---|---|---|
| 5,497,185 A * | 3/1996 | Dufresne et al. .............. 725/11 |
| 6,041,311 A * | 3/2000 | Chislenko et al. ............. 705/27 |
| 6,392,664 B1 * | 5/2002 | White et al. ................. 715/717 |
| 6,438,579 B1 * | 8/2002 | Hosken ....................... 709/203 |
| 6,657,116 B1 * | 12/2003 | Gunnerson .................... 84/615 |
| 6,708,176 B2 * | 3/2004 | Strunk et al. .................. 707/10 |
| 6,731,312 B2 * | 5/2004 | Robbin ........................ 715/792 |
| 6,746,246 B2 * | 6/2004 | Cliff ........................... 434/219 |
| 6,917,373 B2 * | 7/2005 | Vong et al. ................... 715/840 |
| 6,933,433 B1 * | 8/2005 | Porteus et al. ................. 84/615 |
| 6,965,770 B2 * | 11/2005 | Walsh et al. .............. 455/426.1 |
| 6,987,221 B2 * | 1/2006 | Platt ............................ 84/601 |
| 7,003,515 B1 * | 2/2006 | Glaser et al. ................... 707/5 |
| 7,075,000 B2 * | 7/2006 | Gang et al. ................... 84/600 |
| 7,293,060 B2 * | 11/2007 | Komsi ........................ 709/203 |
| 2001/0030660 A1 * | 10/2001 | Zainoulline ................. 345/720 |

(Continued)

FOREIGN PATENT DOCUMENTS

DE          19814254 A1     10/1998

(Continued)

*Primary Examiner*—Curtis Kuntz
*Assistant Examiner*—Paul McCord

(57) ABSTRACT

An audio player apparatus (1) and method (2). The audio player apparatus comprises input means (10), such as buttons (11, 12, 13, 14) or soft-buttons on a touch screen, for inputting the presence of at least one user at a location of said audio player apparatus. The player apparatus (1) further has input means (20) for preferred audio-preferences. Thus audio being reproduced by said audio player apparatus (1) is adapted to the current audio taste and/or mood of users present at the location of the audio player apparatus (1).

18 Claims, 2 Drawing Sheets

U.S. PATENT DOCUMENTS

| | | | |
|---|---|---|---|
| 2002/0040326 A1* | 4/2002 | Spratt | 705/26 |
| 2002/0049717 A1 | 4/2002 | Routtenberg et al. | |
| 2002/0147628 A1* | 10/2002 | Specter et al. | 705/10 |
| 2002/0161865 A1 | 10/2002 | Nguyen | |
| 2002/0178057 A1 | 11/2002 | Bertram et al. | |
| 2003/0074447 A1 | 4/2003 | Rafey et al. | |
| 2003/0078840 A1* | 4/2003 | Strunk et al. | 705/14 |
| 2003/0083755 A1 | 5/2003 | Denoual et al. | |
| 2003/0185406 A1 | 10/2003 | Goodman et al. | |
| 2003/0227478 A1* | 12/2003 | Chatfield | 345/751 |
| 2003/0236582 A1* | 12/2003 | Zamir et al. | 700/94 |
| 2004/0019497 A1* | 1/2004 | Volk et al. | 705/1 |
| 2004/0171377 A1* | 9/2004 | Engstrom | 455/419 |

FOREIGN PATENT DOCUMENTS

| | | |
|---|---|---|
| EP | 1170722 A1 | 1/2002 |
| WO | 0033578 A1 | 6/2000 |
| WO | 02067447 A2 | 8/2002 |

\* cited by examiner

USER AWARE AUDIO PLAYING APPARATUS AND METHOD

FIELD OF THE INVENTION

This invention pertains in general to the field of multimedia devices, and particularly to audio playing devices, such as so-called internet radios, or devices in the form of a jukebox on which a collection of songs is stored, usually digitally. More particularly the invention pertains to such an audio playing device having means for adjusting the type of reproduced audio as well as audio reproduction properties based on the audio preferences of users being present at the location of audio reproduction, as well as a method for performing the adjustment of said audio played and its corresponding audio properties, based on the audio preferences of users being present at the location of audio reproduction from the audio player. Even more particularly the invention relates to a presence and preference aware user interface for an audio player.

BACKGROUND OF THE INVENTION

Typically an audio player is connected to sound reproduction means, such as loudspeakers, and it is operated in a location or a room that is shared by multiple persons. For instance a living room in a private home is shared by a family with a father, a mother and multiple kids, or an office is shared by multiple colleagues, for example. Previously the reproduction of music by means of audio players was limited to the use of a physical medium with very limited storage capacity, such as a vinyl records music cassettes, or CDs. In this case the number of pieces of music accessible from a single storage medium was limited to a number of approximately 10 pieces of music at a time. Alternatively it was possible to tune a radio receiver to a certain station and to listen to the music momentary offered at this station. When a single person is using the audio player for reproducing music at the location, the person chose a storage medium or radio station having a type of music, which fitted both his/her current taste of music and mood. When multiple persons were present at the location, they had to mutually agree on a certain storage medium of radio station, which had to be manually adjusted.

Moreover, due to a combination of the rapidly growing storage capacity of storage media and the advances in digital compression techniques, such as the popular MP3 file format, a user may choose from a tremendously larger amount of pieces of music at the same time. For instance, MP3 files sampled at 128 Kbit/s, typically minimise the amount of storage space needed approximately with a factor of 10 compared to non-compressed files. A CD, for example, has typically a storage capacity of approximately 700 MByte. As Recordable CDs can be used to store MP3 files, and the fact that an average size of an MP3 file typically is approximately 2-3 MBytes, about 300 pieces of music can be stored on a single CD. As a further example, a DVD has about 6 GB storage capacity, i.e. approximately holds more than 2000 average pieces of music. As another example, a portable audio player, such as the IPod® from Apple Inc., can currently have a maximum storage capacity of about 40 GB. Given the above mentioned average size of an MP3 file of about 2-3 MBytes, about sixteen thousand pieces of music can be stored on these audio players storage medium before the storage medium is full. As the past has shown, the amount of storage space available at the same cost will constantly increase, i.e. in the future even more pieces of music will be available on a single storage medium. At the same time the accessibility to networks, such as the Internet, with adequate bandwidth, enables a user to access an in principle unlimited number of e.g. Internet radio stations or other sources for digitally stored and via networks, like the Internet, distributed pieces of music. Several audio players may also be connected to each other via networks.

Therefore it is increasingly difficult for a single user of modern audio player devices to find and play music, which is appropriate for the user's current taste of music and the current mood of the person. Moreover, if multiple persons are present at the location of the audio player, it is virtually impossible to agree on a certain music source playing an adequate type of music fitting all present persons' music taste and current moods. This is caused by the confusingly large choice given to the users.

A similar situation was encountered when the number of available TV channels increased considerably. One approach was to introduce so-called electronic programme guides (EPGs). For instance, the German patent application DE-A1-198 14 254 discloses a query-based electronic television program guide, wherein an EPG database is interrogated to produce a list of programmes that may be of interest to a certain viewer of television programs. DE-A1-198 14 254 teaches that viewing preferences for certain types of television programmes are used for queries to the database. The viewer preferences are either composed by the users themselves or are automatically developed by inspection of viewing habits or viewer profiles, wherein the viewer profiles may also be produced by interrogation of the viewer. Queries relating to different viewers may be merged and queries may restrict selection of certain categories. Based on this, the viewer narrows dynamically a list of proposed TV programs until only a few choices remain. A 10-key alphanumeric keyboard is used for inputting data in form of letter or number codes both for filling the database and for choosing a program to watch. However, this inputting of data is inconvenient, as the user has to keep track of multiple letter or number combinations, among other things. Furthermore, there is no consideration of the current mood of the users. The mood of a user may influence the acceptance of a user of a certain type of music or specific music titles considerably. For instance, if the user is sad, happy or angry, he/she will prefer a different type of music.

Thus, there is a need for a new audio player enabling multiple present users to easily agree on a certain type or selection of music to be played.

In addition to the type of music, the multiple users may also have differing audio-preferences, such as the adjustment of volume, bass, treble etc. It is a problem that the current adjustment of the audio player does not fit the taste of the multiple users present. For instance, such audio preferences may be classified as rock, pop, classic, etc. There is a risk that users will not like a certain piece of music being played with a contradictory audio-adjustment.

The present invention overcomes the above-identified deficiencies in the art and solves at least the above identified problems by providing a method, an audio player apparatus, a computer-readable medium, an audio signal and use of an audio player, according to the appended patent claims.

The general solution according to the invention is that, if multiple persons are present in the room where the player is situated, then the device should know which persons are present and which audio-preferences, i.e. genre or audio-adjustments, are preferred at that time.

The invention provides a simple yet powerful interface to realise this.

More particularly, this is achieved by means of an audio player device being aware of the preferences of each of the persons that are regularly present. These preferences are specified explicitly or implicitly. The preferences are e.g. interpreted as a list of songs on which at least some of the songs are rated on a range from particularly like to particularly dislike, possibly with additional metadata of each song such as genre/mood or links to webpages where more information is stored.

Taking in a selectable genre/mood into consideration enables the user for instance to reflect, support or suppress the current mood, depending on the current mood of the user, such as being sad, happy or angry. This also gives the users a choice to select a genre/mood setting, differing from the current mood of the user, e.g. for getting happy when being sad etc.

According to aspects of the invention, a method, an audio player apparatus, and a computer-readable medium are disclosed.

According to one aspect of the invention, an audio player apparatus is provided. The apparatus comprises input means for inputting the presence of at least one user at a location of said audio player apparatus, as well as input means for audio-preferences. The input means are operatively connected to the audio player apparatus. Audio reproduced by said audio player apparatus is adapted to the audio taste of users present at the location of the audio player apparatus, as indicated by said input means for presence of users.

According to another aspect of the invention, a method of playing audio based on preferences of at least one user of an audio playing device as described above is provided. The method comprises the following steps. In one step, the presence of a user is indicated by an input means on said audio player. In another step a preferred genre/mood of audio to be reproduced by said audio player is indicated by input means on said audio player. Thus audio reproduced by said audio player apparatus is adapted to the audio taste of users present at the location of the audio player apparatus.

According to yet another aspect of the invention, a computer-readable medium having embodied thereon a computer program for processing by a computer comprising a code segments for playing audio based on preferences of at least one user of an audio playing device is provided. The code segments comprise a first code segment enabling at least one user to indicate its presence by an input means on said audio player. A second code segment enables at least one user to indicate a preferred genre/mood of audio to be reproduced by the audio player by input means on said audio player, such that audio reproduced by said audio player apparatus is adapted to the audio taste of users present at the location of the audio player apparatus.

The present invention has the advantage over the prior art that it provides multiple users, having different audio preferences, with an audio player providing with an easily accessible way of agreeing on a common type of audio to be reproduced. Furthermore it offers a single person using an audio player a convenient way of instructing the audio player to select an audio type preferred by that user without the need of giving the audio player cumbersome instructions.

BRIEF DESCRIPTION OF THE DRAWINGS

Further objects, features and advantages of the invention will become apparent from the following description of embodiments of the present invention, whereby reference is being made to the accompanying drawings, in which.

DESCRIPTION OF EMBODIMENTS

Figure 1:
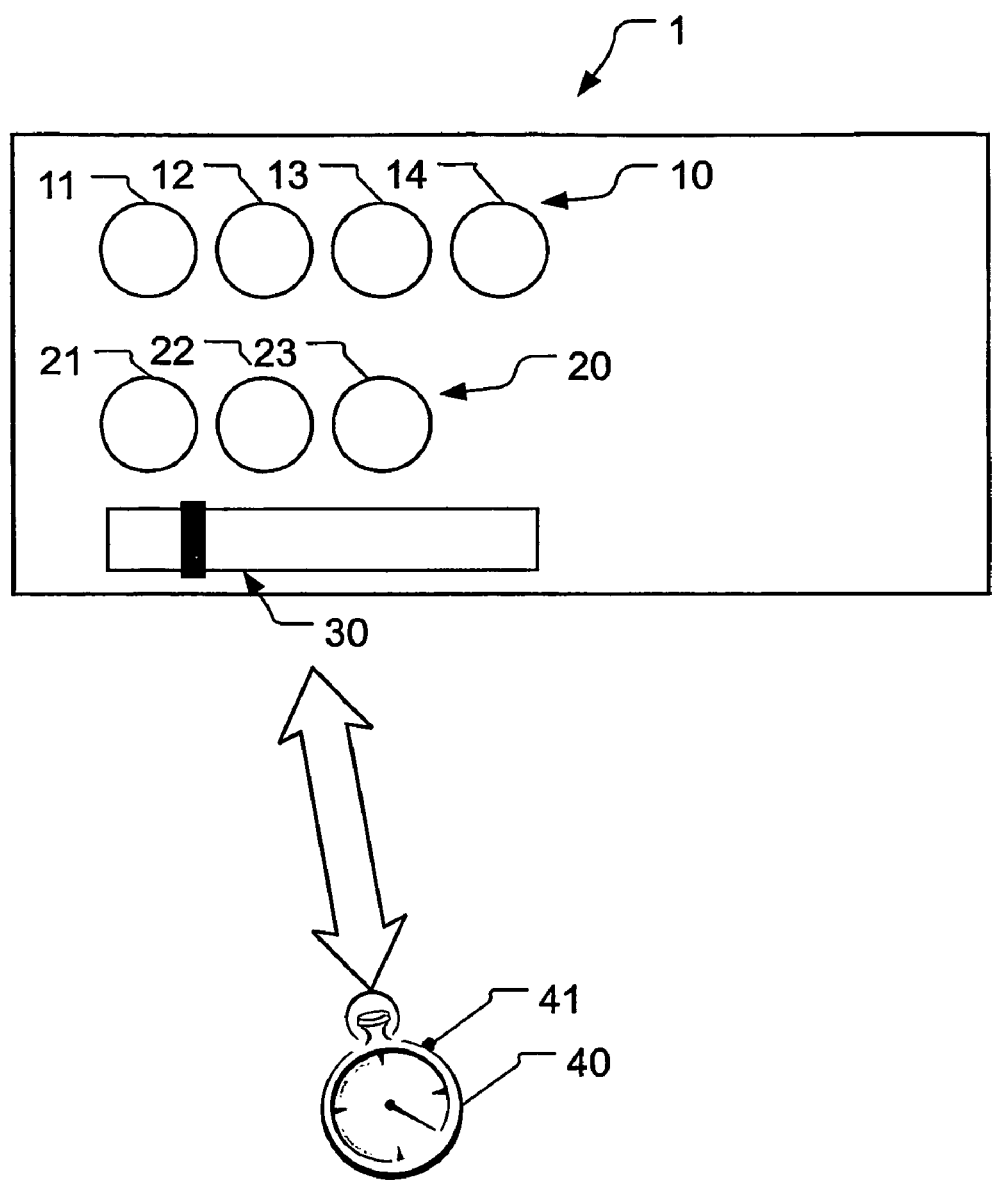
FIG. 1 is a schematic view illustrating an audio player apparatus according to an exemplary embodiment of the invention.

In an embodiment of the invention according to FIG. 1, an audio playing device 1 is provided with a user interface that comprises of two sets of input means 10, 20, such as buttons 11, 12, 13, 14 and 21, 22, 23 respectively. The first set 10 of buttons 11, 12, 13, 14 are presence buttons, and the second set 20 of buttons 21, 22, 23 are genre or mood buttons. For illustrative purposes, further elements necessary for the operation of audio player 1 are omitted in the figure. Furthermore, the number of buttons shown may vary in other embodiments, depending on the intended use of the audio playing device, i.e. there may be more or less buttons in respective group of buttons.

Each presence button 11, 12, 13, 14 is associated with a specific person/user, for which the player knows his/her preferences. Furthermore, a presence button has one of three states, namely not pressed, half-pressed, and pressed. Whenever a person X enters the room where the audio player 1 is located, the person may choose to press his/her personal presence button, either half or completely. If a presence button of person X is half-pressed, then this will have the effect that songs that person X particularly dislikes will not be played. If a presence button of person X is fully-pressed, then the player will try in addition to play songs that are liked by X, taking into account the preferences of other persons that also have indicated their presence. Alternatively to being associated with a single person, a presence button may also be associated with a group of users that are supposed to have a common taste. Furthermore, the presence of a person may influence audio-preferences, such as the adjustment of volume, bass, treble etc. to preferred values. In addition, the persons present should collective choose one of the genres/moods that are available by buttons 21, 22, 23, and press the corresponding genre/mood button 21, 22 or 23. A non-limiting list of examples comprises 'easy listening', 'classical guitar', 'baroque', 'instrumental' 'party music', etc. Hence, at any one time at most one of the genre/mood buttons 21, 22 or 23 is pressed, while at the same time any subset of the presence buttons can be pressed simultaneously, both half or full. Depending on the persons present and the desired genre/mood, the player uses underlying recommender technology to select songs to be played. The recommender technology is e.g. straightforwardly based on lists of songs a user specifically has indicated to like or dislike. More advanced approaches may also be used, based on statistical methods such as bayesian classifiers, or alternative learning approaches that may use low-level features that might be directly derived from the audio signal itself or high-level features such as names of the composer, performer, etc. A person that only pressed his/her button half, will only influence this process in the sense that songs that are particularly disliked are avoided. Preferably, the songs played are of the given genre/mood that are liked by all persons that have fully pressed their presence button. If it turns out that the crosssection is empty, then it may choose songs that are liked by most of the persons present, making sure that at least all persons present will like some of the presented songs. Obviously, different strategies are possible here. An additional control means, such as a slider 30, is optionally present in the user interface. By means of slider 30 the user indicate how strictly the player should try to follow the preferences of the different persons. If put on very strict, then it will try to play only songs that are all liked by all persons in the room. If put on the other extreme, it will try to mix such that persons will be more confronted with songs that they might not have indicated to be particularly liked by themselves, but they will be liked by at least one of the others. In mathematical terms, in the first case songs are played from the intersection of the songs liked: by all persons, In the second case songs are played from the union of their preferred songs, In this way, persons can indicate how much of their personal taste will be 'disclosed' to the others present. We assume that each genre/mood represents a relatively large subset of total collection of songs.

In addition, users may have a means to give feed-back on songs played, e.g. by pressing a button 41 on their watch 40 and transmitting the feedback information via a wireless transmission link, as e.g. a bluetooth link, to the audio player 1. In this way the audio player 1 is able to adapt the stored preferences of the individual users.

Below, two examples are given to illustrate the usage of audio player 1.

Suppose the audio player is positioned in a living room of a home in which live a family with three kids A, B, and C. Each of the kids has his/her specific likes and dislikes, which preferences can be quite strong. At a given moment, the kids could agree to play songs of A, while avoiding songs that the other two specifically dislike. For that, they simply have to fully press the presence button of A and to press the respective presence buttons of B and C half.

In another example, persons meet each other at a party. They could bring their preferences as stored on their personal digital assistant device (PDA), or personal storage device, which they might want to share with the other persons present. Sharing may be performed via a wireless network, such as the bluetooth® network, but also via a cable connection. The persons collectively choose party music as genre/mood, and agree on how strict the tastes of the persons should be followed. Should the player preferably select from the intersection or from the union of their preferred songs. The songs might be chosen from the collections of songs that are contributed by the different persons.

Above it is assumed that only one of the genre/mood buttons 21, 22, 23 may be pressed simultaneously. Alternatively, a subset of these buttons however may be pressed. In that case a good mix of the selected genres/moods is persued.

The presence buttons 11-14 may also each be given a separate colour, such that a person can be associated with a specific colour. This facilitates operation of the audio player device 1. The genre/mood buttons 21-23 may have fixed labels, or are given pictograms to which genres/moods can be later attached by the users. Depending on the persons living in the home, another collection of genres might be identified as appropriate.

The above user interface can be implemented in different settings. Alternatively, the preferences of persons might not be specified explicitly as a list of songs but as a list of preferred features. The songs are e.g. stored on a local storage device, or are alternatively downloaded on-line or streamed from different available internet radio stations. The buttons might be real physical ones on a tangible device, as shown with reference to the above embodiment, or alternatively buttons are displayed on a (touch-)screen, or a TV-set. The preferences are either given explicitly by the respective users in a so-called user profile. The user profile may be 'programmed' by means of a PC that is available in the home or office. The profile can be downloaded to the audio playing device, or the device might access the stored profiles whenever appropriate.

Figure 2:
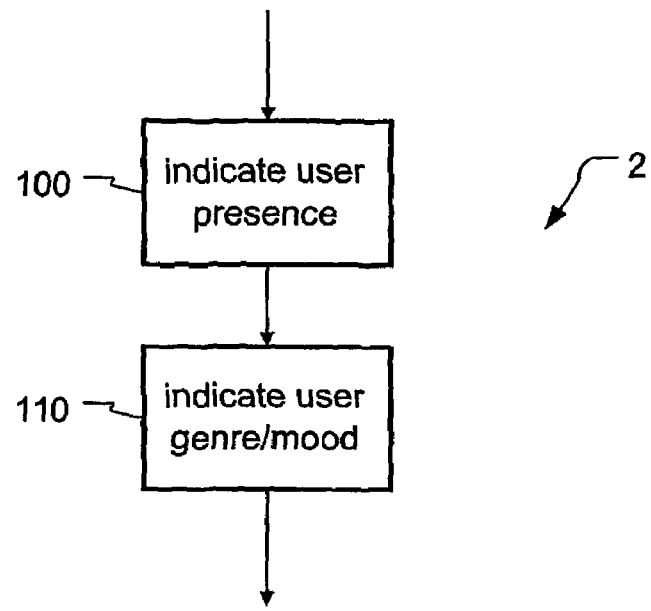
FIG. 2 is a flowchart illustrating an audio playing method according to another embodiment of the invention.
Figure 3:
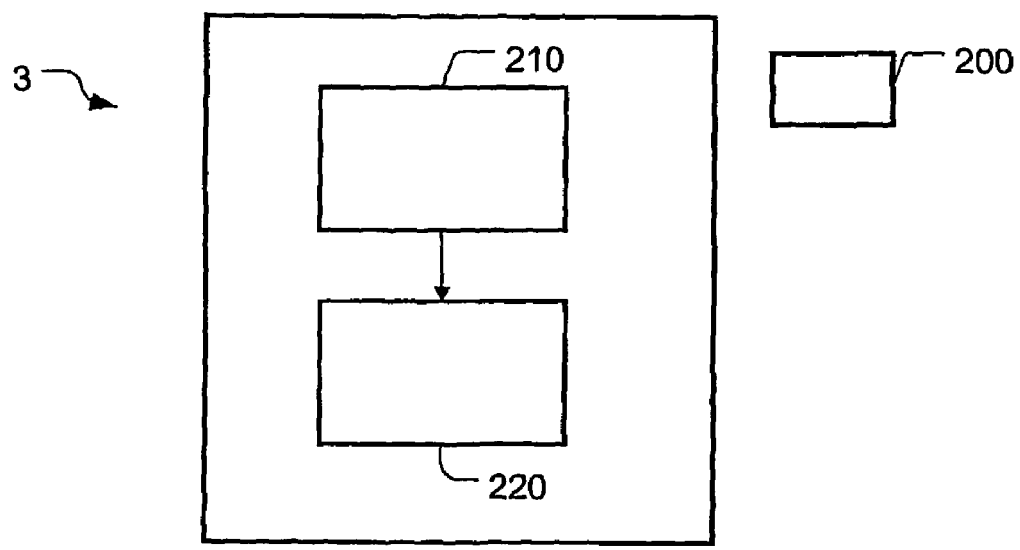
FIG. 3 is a schematic diagram illustrating a computer readable medium according to another embodiment of the invention.

A further embodiment of another aspect of the invention is illustrated in FIG. 2. A method 2 comprises the steps 100 and 110. In step 100 the user indicates its presence and in step 110 the user chooses a preferred genre/mood, as described above with reference to the audio player shown in FIG. 1.

According to an embodiment of another aspect of the invention, a computer-readable medium 3 having embodied thereon a computer program for processing by a computer 200 comprising a code segments for playing audio based on preferences of at least one user of an audio playing device is provided. The code segments comprise a first code segment 210 enabling at least one user to indicate its presence by an input means on said audio player. A second code segment 220 enables at least one user to indicate a preferred genre/mood of audio to be reproduced by the audio player by input means on said audio player, such that audio reproduced by said audio player apparatus is adapted to the audio taste of users present at the location of the audio player apparatus.

Applications and use of the above described audio player apparatus, method and program code according to aspects of the invention are various and include exemplary fields such as portable audio players, car audio equipment, internet radios, digital jukebox devices, etc.

The present invention has been described above with reference to specific embodiments. However, other embodiments than the preferred above are equally possible within the scope of the appended claims, e.g. different ways of reproducing the audio than those described above, performing the above method by hardware or software, etc.

Furthermore, the term "comprises/comprising" when used in this specification does not exclude other elements or steps, the terms "a" and "an" do not exclude a plurality and a single processor or other units may fulfill the functions of several of the units or circuits recited in the claims.

The invention claimed is:

1. A player apparatus comprising:
an input device that is configured to identify a presence of each user of a plurality of users at a location of the player apparatus, and to identify a playback mode associated with each user,
a storage element that is configured to provide preferences that include likes and dislikes of each user, and
a control element that is configured to select content material to be played by the player apparatus based on the preferences of the plurality of users present, wherein
the control element is configured to select the content material, such that, for each present user:
if the playback mode of the user is a first mode, the selection of the the control element functions to prevent selection of content material that is disliked by the user, and
if the playback mode of the user is a second mode, the selection of the content material is based on the likes of the user.

2. The player apparatus of claim 1, wherein the input device includes a set of buttons, wherein each button is associated with one or more users of the plurality of users.

3. The player apparatus of claim 2, wherein each button is configured to indicate a state associated with the one or more users.

4. The player apparatus of claim 3, wherein the state includes:
a first state indicating that the associated user is not present,
a second state indicating that the associated user is present and the playback mode is the first mode, and a third state indicating that the associated user is present and the playback mode is the second mode.

5. The player apparatus of claim 1, wherein the input device is configured to indicate a preferred genre/mood of the material to be reproduced by the player apparatus.

6. The player apparatus of claim 1, wherein the preferences include volume, bass, treble preferences.

7. The player apparatus of claim 1, wherein the input device is configured to provide an indication of how strictly the player follows the preferences of the plurality of users.

8. The player apparatus of claim 1, wherein the the control element includes recommender technology means for selecting the content material to be played.

9. The player apparatus of claim 1, wherein the player apparatus includes portable audio players, car audio equipment, internet radios, or digital jukebox devices.

10. A method of playing content material on a playback device that is configured to select the content material based on preferences of a plurality of users, the method comprising:
receiving an indication of a presence of each user of the plurality of users, and receiving an indication of a playback mode associated with each user, and
selecting content material for playback based on preferences that include likes and dislikes of each user, such that, for each user:
if the playback mode of the user is a first mode, the selection of the content material that is disliked by the user is prevented, and
if the playback mode of the user is a second mode, the selection of the content material is based on the likes of the user.

11. A computer-readable medium having embodied stored thereon a computer program for processing by a computer comprising a code segments for playing content material based on preferences of a plurality of users, the code segments comprising:

a first code segment enabling determination of a presence of each user of the plurality of users,
a second code segment enabling determination of likes and dislikes of each user, and
a third code segment enabling selection of content material for playback, such that, for each user:
if the playback mode of the user is a first mode, the selection of the content material that is disliked by the user is prevented, and
if the playback mode of the user is a second mode, the selection of the content material is based on the likes of the user.

12. The player apparatus of claim 1, wherein the control element is configured to select only content material that is liked by all users in the second mode.

13. The player apparatus of claim 1, wherein the control element is configured to select only content material that is liked by all users in the second mode, and not disliked by any user in the first mode.

14. The player apparatus of claim 1, wherein the control element is configured to select only content material that is not disliked by any user.

15. The method of claim 10, including selecting only content material that is liked by all users in the second mode.

16. The method of claim 10, including selecting only content material that is liked by all users in the second mode, and not disliked by any user in the first mode.

17. The method of claim 10, including selecting only content material that is not disliked by any user.

18. The method of claim 10, including receiving a degree of strictness to be applied, and controlling a degree to which the selection of content material is affected by the likes and dislikes of the users.

* * * * *